Jan. 3, 1961 S. E. KAY ET AL 2,967,112
METHOD AND APPARATUS FOR APPLYING METAL-DEPOSITING SOLUTIONS
Filed March 10, 1959
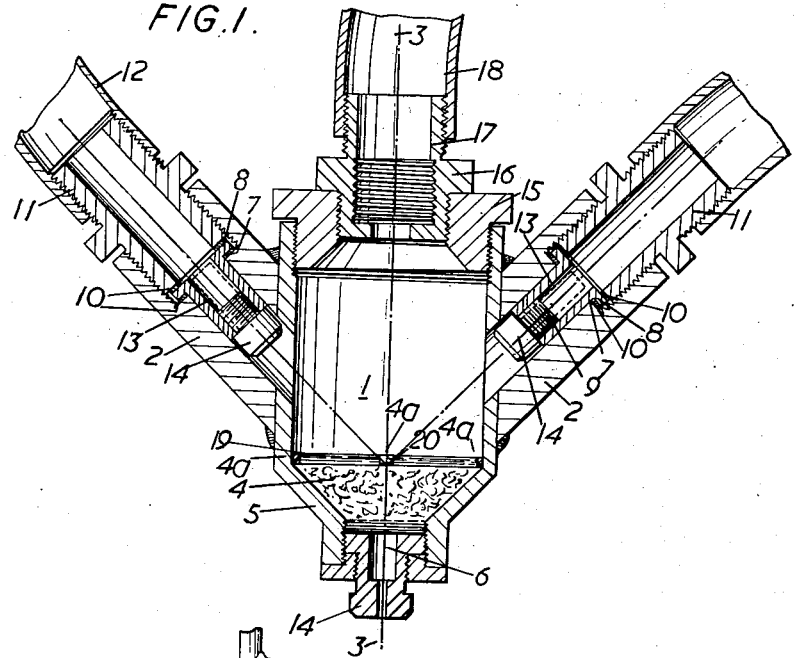
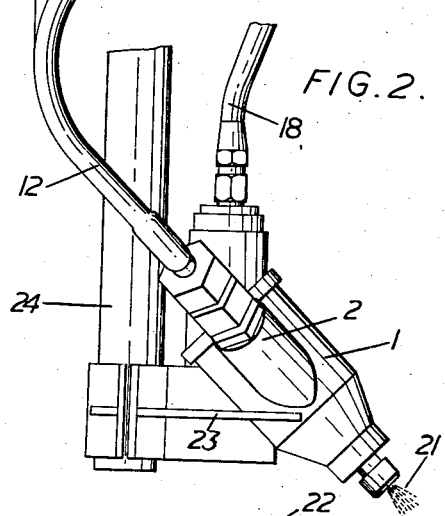
Inventor
Solomon Elijah Kay +
Robert John Ball
By
Morrison, Kennedy + Campbell
Attorney

United States Patent Office 2,967,112
Patented Jan. 3, 1961

---

2,967,112

METHOD AND APPARATUS FOR APPLYING METAL-DEPOSITING SOLUTIONS

Solomon E. Kay, Windle, St. Helens, and Robert J. Ball, Haresfinch, St. Helens, England, assignors to Pilkington Brothers Limited, Lancashire, England, a company of Great Britain Filed Mar. 10, 1959, Ser. No. 798,528

Claims priority, application Great Britain Mar. 11, 1958

10 Claims. (Cl. 117—35)

This invention relates to the deposition of metals upon surfaces and more particularly to the silvering of glass surfaces, for example, glass mirrors.

A main object of the present invention is to provide an improved process for depositing metal upon a surface by means of the chemical interaction in solution between the metal in ionic form, for example, silver in the form of a complex silver-ammonia or amino ion, and one or more reducing agents capable of reducing the metal in ionic form to metal in metallic form, and an apparatus for carrying out the improved process.

A solution containing a metal in ionic form and from which metal in metallic form can be precipitated by one or more suitable reducing agents will be referred to hereinafter as a "metal-depositing solution" and a solution containing one or more reducing agents capable of precipitating metal in metallic form from a solution containing metal in ionic form will be referred to hereinafter as a "reducing solution."

The present invention provides a process of depositing metal upon a surface by means of chemical interaction between a metal-depositing solution and a reducing solution comprising injecting at controlled rates into a mixing chamber separate streams of the metal-depositing solution and the reducing solution, intimately mixing the streams within the chamber, and expelling the mixed solution from the chamber as fine droplets towards the surface to be coated before its components have interacted to form appreciable quantities of the metal.

The present invention also comprehends apparatus for carrying out a process according to the invention, which apparatus comprises a mixing chamber, conduits for the metal-depositing solution and reducing solution leading into the mixing chamber, a conduit for compressed air leading into the mixing chamber, means for mixing the streams of solution fed into the mixing chamber, and a delivery orifice communicating with the mixing chamber capable of discharging the mixed solution in the form of fine droplets under the pressure existing inside the mixing chamber, the mixing means being arranged so that under the pressure existing inside the chamber the mixed solution is expelled from the delivery orifice before its components have interacted to form any appreciable quantity of metal.

In order to aid intimate mixing, the solution supply conduits, or the solution supply conduits and the compressed air supply conduits, may converge towards a mass providing a network of tortuous intersecting passageways for fluid flow, and interposed in front of the delivery orifice of the mixing chamber.

As a still further aid to mixing, the solution supply conduits may terminate in nozzles adapted to convert continuous streams of solution into streams of discrete droplets.

The streams of droplets of mixed solution expelled from the mixing chamber coalesce on the surface to be coated to form on the surface a thin layer of intimately mixed solution from which the metal is precipitated onto the surface, the precipitation occurring on the surface due to the expulsion of the droplets from the mixing chamber being effected before any substantial interaction has occurred, and the time taken for the droplets to travel to the surface from the mixing chamber, being in general, so short as to be immaterial as regards interaction.

In order that the invention may be more clearly understood a preferred embodiment thereof as employed for silvering will now be described, by way of example, with reference to the accompanying drawings, in which:

Figure 1 is a central axial cross sectional view through the mixing chamber and associated supply conduits, and Figure 2 is a side elevation view of the whole silvering apparatus, as used in operation.

In the drawings like references designate the same or similar parts.

Referring to Figure 1 of the drawings, a mixing chamber indicated generally at 1 includes a pair of branch feeding pipes 2 symmetrically disposed about the axis 3 of the mixing chamber so as to converge towards a wad 4 of stainless steel wool secured by stops 4a into the mixing chamber in its frustoconical base portion 5 in front of the delivery orifice 6.

Each branch pipe 2 is counter-bored at its end so as to provide an annular flange 7 inside the pipe. Against the annular flange 7 abuts the annular shoulder 8 of a jet member 9 the body of which is a sliding fit within the part of the branch pipe interior to the flange 7. A washer 10 of plastic or rubbery material is interposed between the shoulder 8 and the flange 7 to ensure a fluid-tight fit.

Secured within the part of each branch pipe exterior to the flange is the inner end of a liquid supply union 11, another sealing washer 10 of plastic or rubbery material being interposed between this end of the union 11 and the exterior face of the shoulder 8 in order to ensure that all the liquid supplied through the union 11 enters the jet member 9. Over the outer ends of the unions 11 are secured liquid supply conduits 12 constructed of flexible plastic material, one conduit constituting the conduit for supply of reducing solution and the other conduit constituting the conduit for supply of silvering solution. By the term "silvering solution" there is meant a solution containing silver in ionic form, for example silver in the form of a complex silver-ammonia or amino ion, and the reducing solution for use with the silvering solution is a solution containing one or more reducing agents capable of precipitating metallic silver from the silvering solution.

Each jet member 9 includes an axial filter 13 and a nozzle 14, the dimensions of the nozzle 14 controlling the rate of inflow of the liquid solutions into the mixing chamber for a given supply pressure. The top of the mixing chamber is closed by a bushing 15 within which is secured a union 16 over the outer end 17 of which fits the hose 18 for the compressed air supply.

In operation, streams of droplets of silvering and of reducing solutions, the droplets being produced by the nozzles 14 of the jet members 9, are injected into the mixing chamber so as to converge towards the wad 4 of stainless steel wool, and form a shallow pool 19 just covering the top surface of the wad, the actual point of convergence of the axes of the jet members 9 being indicated at 20 immediately above the top surface of the bed. The interstices between the strands of the wool provide a network of tortuous intersecting passageways through which the solutions flow and are thereby thoroughly intermingled. The downward pressure on the upper surface of the pool, created by the introduction of compressed air into the mixing chamber through hose 18 augments the gravitational forces acting on the solutions, and serves to force the solutions through tortuous passageways provided by the wad 4 and expel the resulting mixed solutions through the wad and out of the mixing chamber through the delivery orifice 6. The delivery orifice includes a nozzle 14 having a bore which flares outwardly in the axial plane of the mixing chamber at right angles to the axial plane containing the branch pipes and which converts the solution passing therethrough into a fan-like stream of droplets indicated at 21. The geometry of the chamber and the sizes of the inlet and outlet nozzles are chosen so that the total time between initial contacting of the solutions and deposition of the mixed solution on the surface to be silvered is controlled so as to be sufficiently short as not to result in any appreciable interaction of the components of the mixed solutions, but yet sufficiently long to enable effective mixing.

As shown in Figure 2 the direction of projection of the streams of mixed droplets, which coincides with the axis 3—3 of the mixing chamber, is arranged to be at an angle of from 30° to 60° to the surface 22 to be silvered so that any reflected droplets impinge on parts of the surface already silvered. The actual angle within this range which is employed depends on the type of nozzle 14 and speed of the conveyor for the surface 22, as hereinafter described.

In order that the angle of projection may be adjusted as required, the mixing chamber 1 is pivotably mounted between the arms of a yoke 23 secured to a support 24.

Since, in general the area of the surface to be silvered is considerably greater than the area covered by the diverging stream of droplets expelled from the mixing chamber nozzle, it is usually necessary to cause the silvering apparatus to travel over the whole of the surface.

In one method of effecting this the surface is carried on a conveyor belt and the support 24 for the projecting apparatus is mounted on a carriage, situated above the conveyor belt, which reciprocates at right angles and at constant velocity to the direction of movement of the conveyor belt, so that successive transverse bands of the surface are silvered.

In this method of operation, the amount of silver deposited on the surface depends on the relative rates of travel of the conveyor belt and the carriage and also on the rates of flow of the silvering and reducing solutions and their compositions.

The rates of flow of the silvering and reducing solutions are desirably adjusted so that the amount of silver deposited, in the case when the surface to be coated is the surface of a glass mirror, is within the range 7–25 mgms. per sq. dm. on the glass surface. Preferably however, the amount deposited in the case of a glass mirror is within the range 12–18 mgms. per sq. dm.

The rates of flow of the silvering and reducing solutions necessary for this amount of silver to the deposited on the surface to be silvered may be obtained by control of the pressures under which the solutions are fed through the supply conduits 12 and the size of the nozzle 14, the ratio of these rates being dependent, of course, on the actual nature of the silvering and reducing solutions employed.

However, it is preferred to create in the mixing chamber a constant air pressure, by means of a needle valve (not shown) in the supply hose 18, which air pressure can act as a back-pressure exerting a secondary control over the rates of inflow of the solutions into the mixing chamber; for example, the liquid feed pressures may be set at about 25 lbs. per sq. in. and an air pressure of 20 lbs. per sq. in. created within the mixing chamber so that the resultant rate of inflow of the solutions through the nozzles 14 is equivalent to that produced by an unrestricted liquid feed pressure of 5 lbs. per sq. in.

In a modified form of apparatus in accordance with the present invention, the wad of stainless steel wool in the bottom of the mixing chamber is replaced by a bed of small glass balls, of $\frac{1}{16}-\frac{1}{4}''$ diameter, retained in place between a pair of screens secured at their edges around the inside of the mixing chamber, the interstices between the balls providing the network of tortuous intersecting passageways for fluid flow.

By means of the present invention there is provided a silvering process that consumes considerably less compressed air, for a given amount of surface to be silvered, than a spraying process wherein the compressed air has to effect both the atomisation and the projection of the silvering and reducing solutions towards the surface to be silvered, and because of pre-mixing a more efficient reducing reaction is obtained, thereby improving the economy of the process. Additionally, the characteristics of the mixing chamber compared with the conventional spray guns enable more uniform working because of the absence of moving components.

The process and apparatus of the present invention may be used for coppering instead of silvering, in which case suitable metal-depositing and reducing solutions are for example, a cuprous complex solution which may be ammoniacal solution of cuprous oxide in aqueous ammonia sulphate, and a dilute solution of a mineral acid. Typical working solutions for use in the process and apparatus according to the invention are as follows:

*Cuprous complex solution*

Cuprous oxide_____gms__ 10
Ammonium sulphate_____gms__ 30
Ammonia (0.880)_____ccs__ 25
Water to 1 litre.

The solution is made up by adding the ammonium sulphate and ammonia to the cuprous oxide, and then making the mixture up to 1 litre by the addition of water, giving the reaction

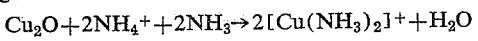

*Acid solution*

5 gms. of concentrated sulphuric acid are made up to 1 litre with water.

In operation, the cuprous complex solution is used at the rate of 160 ccs./min./sq. foot to be processed, and the acid solution at the rate of 200 ccs./min./sq. foot to be processed. The reaction between the solutions to deposit metallic copper is

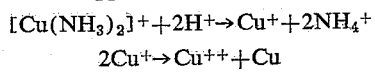

$$2Cu^+ \rightarrow Cu^{++} + Cu$$

In this aspect the present invention includes the subsequent coppering of a glass surface, for example, the surface of a glass mirror which has already been silvered by a process in accordance with the present invention.

Instead of being secured to a support, as shown in Figure 2, the mixing chamber 1 may be provided with a handle so that it can be used for hand spraying, and the compressed air supply may be connected to the mixing chamber through a valve controlled by a trigger on the handle.

We claim:

1. A process of depositing a metal upon a surface by means of chemical interaction between a metal-depositing solution and a reducing solution, comprising injecting at controlled rates into a mixing chamber separate streams of the metal-depositing solution and the reducing solution to form a pool of liquid, and supplying compressed air to the chamber to mix the solutions intimately by forcing said pool of liquid through tortuous paths within the chamber and to expel the mixed solution from the chamber as fine droplets towards the surface to be coated before its components have interacted to form appreciable quantities of the metal.

2. A process according to claim 1, wherein the metal-depositing solution is a silvering solution.

3. A process according to claim 1, wherein the metal-depositing solution is a coppering solution.

4. Apparatus for carrying out a process of depositing a metal upon a surface by means of chemical interaction between a metal-depositing solution and a reducing solution, comprising a mixing chamber, conduits for the metal-depositing solution and reducing solution leading into the mixing chamber, a conduit for compressed air leading into the mixing chamber, means in the mixing chamber for intimately mixing the streams of solution fed into the mixing chamber, and a delivery orifice communicating with the mixing chamber capable of discharging the mixed solution in the form of fine droplets under the pressure existing inside the mixing chamber, the mixing means being arranged so that under the pressure existing inside the chamber the mixed solution is expelled from the delivery orifice before its components have interacted to form any appreciable quantity of metal.

5. Apparatus according to claim 4, wherein the solution supply conduits, converge towards a mass providing a network of tortuous intersecting passageways for fluid flow, interposed in front of the delivery orifice of the mixing chamber.

6. Apparatus according to claim 5, wherein the solution supply conduits terminate in nozzles adapted to convert continuous streams of solution into streams of discrete droplets.

7. Apparatus according to claim 6, wherein the mass is constituted of stainless steel wool.

8. Apparatus according to claim 4, wherein the solution supply conduits and the compressed air supply conduit converge towards a mass providing a network of tortuous intersecting passageways for fluid flow, and interposed in front of the delivery orifice of the mixing chamber.

9. Apparatus according to claim 8, wherein the mass is constituted of stainless steel wool.

10. Apparatus according to claim 8, wherein the solution supply conduits terminate in nozzles adapted to convert continuous streams of solution into streams of discrete droplets.

References Cited in the file of this patent

UNITED STATES PATENTS

| | | |
|---|---|---|
| 1,574,544 | Bart | Feb. 23, 1926 |
| 1,981,405 | Wrede | Nov. 20, 1934 |
| 1,989,800 | Gustin | Feb. 5, 1935 |
| 2,022,481 | Schellenger | Nov. 26, 1935 |
| 2,214,476 | Peacock | Sept. 10, 1940 |
| 2,566,127 | Fuhrman | Aug. 28, 1951 |